US009266782B2

(12) United States Patent
Langensiepen et al.

(10) Patent No.: US 9,266,782 B2
(45) Date of Patent: Feb. 23, 2016

(54) LARGE XENOTIME CERAMIC BLOCK AND DRY PROCESS FOR MAKING THE SAME

(75) Inventors: Ralph Alfred Langensiepen, Corning, NY (US); Joseph James McIntosh, Painted Post, NY (US); Tracey Lynn Timmons, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 173 days.

(21) Appl. No.: 13/881,542

(22) PCT Filed: Oct. 25, 2011

(86) PCT No.: PCT/US2011/057621
§ 371 (c)(1),
(2), (4) Date: Apr. 25, 2013

(87) PCT Pub. No.: WO2012/058194
PCT Pub. Date: May 3, 2012

(65) Prior Publication Data
US 2013/0224465 A1    Aug. 29, 2013

Related U.S. Application Data

(60) Provisional application No. 61/408,071, filed on Oct. 29, 2010.

(51) Int. Cl.
*C04B 35/505* (2006.01)
*C03B 17/06* (2006.01)
*C04B 35/447* (2006.01)
*C04B 35/626* (2006.01)

(52) U.S. Cl.
CPC ............ *C04B 35/505* (2013.01); *C03B 17/064* (2013.01); *C04B 35/447* (2013.01); *C04B 35/6262* (2013.01); *C04B 2235/3225* (2013.01); *C04B 2235/5436* (2013.01);
(Continued)

(58) Field of Classification Search
CPC ..................................................... C03B 17/064
See application file for complete search history.

(56) References Cited

U.S. PATENT DOCUMENTS

| 6,889,526 B2 | 5/2005 | Pitbladdo ........................ 65/53 |
| 7,690,221 B2 | 4/2010 | Pitbladdo ....................... 65/195 |
| 8,067,326 B2 | 11/2011 | Godard et al. ................ 501/152 |

(Continued)

FOREIGN PATENT DOCUMENTS

| JP | H01270558 | 10/1989 | .............. C04B 35/00 |
| JP | 2008-526671 A | 7/2008 | |
| JP | 101468918 | 6/2012 | ............ C04B 35/626 |
| WO | 2006/073841 A1 | 7/2006 | |

*Primary Examiner* — Erin Snelting
(74) *Attorney, Agent, or Firm* — Kevin M. Able; Thomas R. Beall; Ryan T. Hardee (57) ABSTRACT

A ceramic block consisting essentially of substantially homogeneous $(Y_2O_3)_x \cdot P_2O_5$, where $0.95 \leq x \leq 1.05$, having length LL, a width WW and a height HH, and a volume W of at least $8 \times 10^{-3}$ m³ essentially free of cracks throughout the volume, a density of at least 85% of the theoretical maximal density of $Y_2O_3 \cdot P_2O_5$ under standard conditions, and a creep rate CR at 1250° C. and 6.89 MPa; where $CR \leq 8.0 \times 10^{-6}$ hour⁻¹ and method for making the same. The method utilizes a dry process where the starting $YPO_4$-based ceramic material is synthesized by reacting anhydrous $P_2O_5$ with dry $Y_2O_3$ powder.

18 Claims, 3 Drawing Sheets

(52) U.S. Cl.
CPC .. *C04B 2235/5472* (2013.01); *C04B 2235/604* (2013.01); *C04B 2235/608* (2013.01); *C04B 2235/6562* (2013.01); *C04B 2235/6565* (2013.01); *C04B 2235/6567* (2013.01); *C04B 2235/72* (2013.01); *C04B 2235/721* (2013.01); *C04B 2235/77* (2013.01); *C04B 2235/95* (2013.01); *C04B 2235/96* (2013.01); *C04B 2235/9615* (2013.01)

(56) References Cited

U.S. PATENT DOCUMENTS

| | | | |
|---|---|---|---|
| 2008/0196449 | A1 | 8/2008 | Addiego et al. ............. 65/17.3 |
| 2008/0202164 | A1* | 8/2008 | Hoysan ........................ 65/90 |
| 2009/0131241 | A1 | 5/2009 | Godard et al. ................ 501/106 |
| 2009/0211299 | A1 | 8/2009 | Tanner ..................... 65/374.13 |
| 2010/0210444 | A1 | 8/2010 | Rhoads ....................... 501/106 |
| 2012/0324954 | A1 | 12/2012 | Lamberson et al. ............. 65/53 |

* cited by examiner

LARGE XENOTIME CERAMIC BLOCK AND DRY PROCESS FOR MAKING THE SAME

This application claims the benefit of priority under 35 U.S.C. §365 of International Patent Application Serial No. PCT/US11/57621 filed on Oct. 25, 2011 designating the United States of America, which claims the benefit of priority under 35 U.S.C. §119 of U.S. Provisional Application No. 61/408071 filed on Oct. 29, 2010 the contents of which are hereby relied upon and incorporated herein by reference in its entirety.

TECHNICAL FIELD

The present invention relates to $YPO_4$-based ceramic materials and process for making such materials. In particular, the present invention relates to large $YPO_4$-based ceramic blocks having low levels of contaminants, low creep rate at elevated temperatures and processes for making such blocks. The present invention is useful, e.g., in making isopipes used in the overflow down-draw processes for making glass sheet suitable for LCD glass substrates.

BACKGROUND

Figure 1:
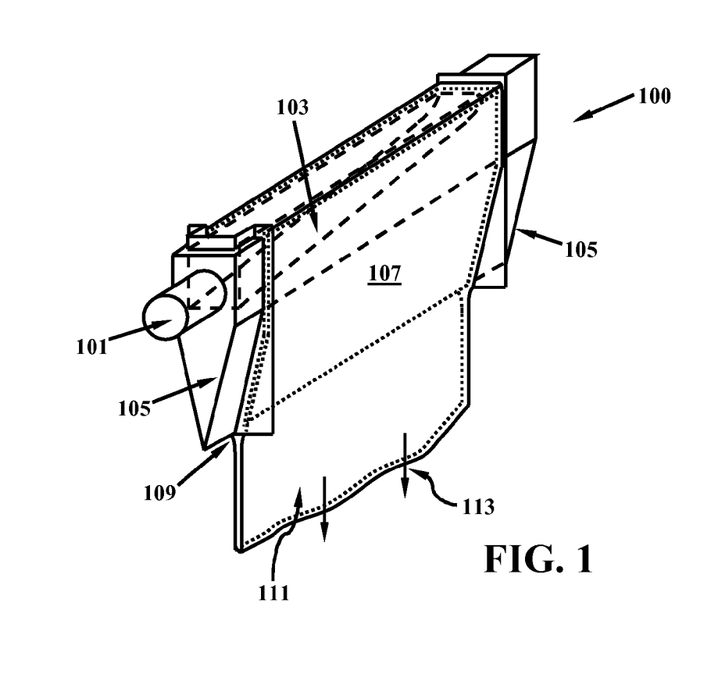
FIG. 1 is a schematic illustration of an isopipe in operation in an overflow down-draw process for making a glass sheet.

Fusion down-draw is a leading precision technology developed by Corning Incorporated, Corning, N.Y., U.S.A. for making thin glass sheets suitable for use as liquid crystal display (LCD) glass substrates and in other opto-electronic devices. This process is schematically illustrated in FIG. 1. A stream of molten glass is introduced into a forming trough 103 called isopipe with end-caps 105 at both ends and having two side surfaces converging at a line called root 109 via an inlet pipe 101 coupled to the trough of the isopipe. The glass melt is then allowed to overflow both top surfaces of the trough of the isopipe called weirs, flow down along both side surfaces of the isopipe as two molten glass ribbons 107, then join and fuse at the root 109 to form a single glass ribbon 111, which is then drawn down in the direction 113 and cooled below the root to form the glass sheet with desired dimensions. In the zone below the root, the glass ribbon travels substantially vertically downward while being drawn and cooled from a viscous state, to visco-elastic and eventually to substantially elastic. The elastic glass ribbon is then cut into individual glass sheets, subjected to further finishing such as edge rounding and polishing, and then packaged and shipped to LCD panel makers for use as TFT or color filter substrates. Cutting of the glass ribbon at below the isopipe typically involves the scoring of the ribbon surface, followed by bending along the score-line, whereby discrete glass sheets are separated from the ribbon and then transferred to subsequent steps.

One of the advantages of the fusion down-draw process for making glass sheets is that the surface quality of the glass sheets is high because the quality areas thereof were only formed in the atmosphere and never touched a solid material such as the forming equipment. This process has been used successfully for making glass sheets having a width as large as 3000 mm and a thickness of about 0.6 mm.

The average size of LCDs for the consumer electronics market has increased steadily in the past decade, along with the demand for higher image quality. These have fueled the demand of large-width glass substrates and posed increasingly more stringent requirements for glass sheet quality, such as edge warp and waviness, sheet warp, surface waviness and roughness, thickness uniformity, as well as stress.

At the center of the overflow down-draw process is the isopipe. The dimension and dimension stability of the isopipe has significant impact on the dimension and dimension stability of the glass sheet formed. The isopipe is typically made of a refractory block of material such as zircon ceramics. While the isopipe is supported on both ends, it is typically not supported in the middle. At the high operating temperatures and under the heavy load of the gravity of the isopipe and the glass melt inside the trough and on the surfaces, the isopipe is subject to slow deformation due to a physical phenomenon called creeping. The higher the creep rate of the material of the isopipe, the more the isopipe can creep over a given period of time. In addition, the isopipe material is desirably stable and corrosion-resistance with respect to the glass melt it handles. While zircon was found acceptable for making LCD glass substrates for smaller generation glass sheets, it has relatively high creep rate for even larger generation isopipes, such as those having a length of over 3000 mm. In addition, zircon was found to be less than ideal in corrosion-resistance for some glass compositions.

$YPO_4$-based ceramic materials were proposed for isopipes previously. However, making large-size ceramic materials based on $YPO_4$ is not an easy undertaking. Therefore there remains a need of a large ceramic block based on $YPO_4$ suitable for an isopipe and method for making the same. The present invention satisfies this and other needs.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

Thus, a first aspect of the present invention relates to a ceramic block consisting essentially of substantially homogeneous $(Y_2O_3)_x \cdot P_2O_5$, where $0.95 \leq x \leq 1.05$, having a length LL, a width WW and a height HH, and a volume VV of at least $8 \times 10^{-3}$ $m^3$ essentially free of cracks throughout the volume, a density of at least 85% of the theoretical maximal density of $Y_2O_3 \cdot P_2O_5$ under standard conditions, and a creep rate at 1250° C. and 6.89 MPa (1000 psi) of CR, where $CR \leq 8.0 \times 10^{-6}$ $hour^{-1}$, in certain embodiments $CR \leq 7.0 \times 10^{-6}$ $hour^{-1}$, in certain embodiments $CR \leq 6.0 \times 10^{-6}$ $hour^{-1}$, in certain embodiments $CR \leq 5.0 \times 10^{-6}$ $hour^{-1}$, in certain embodiments $CR \leq 4.0 \times 10^{-6}$ $hour^{-1}$, in certain embodiments $CR \leq 3.0 \times 10^{-6}$ $hour^{-1}$, in certain embodiments $CR \leq 2.0 \times 10^{-6}$ $hour^{-1}$ In certain embodiments of the first aspect of the present invention, $1.00 \leq x \leq 1.05$, in certain embodiments $1.00 \leq x \leq 1.03$, in certain other embodiments $1.00 \leq x \leq 1.02$.

In certain embodiments of the first aspect of the present invention, $LL \geq 20$ cm, $WW \geq 20$ cm, and $HH \geq 20$ cm.

In certain embodiments of the first aspect of the present invention, $LL \geq 50$ cm, $WW \geq 30$ cm, and $HH \geq 50$ cm.

In certain embodiments of the first aspect of the present invention, $LL \geq 100$ cm, $WW \geq 30$ cm, and $HH \geq 50$ cm.

In certain embodiments of the first aspect of the present invention, $LL \geq 200$ cm, $WW \geq 30$ cm, and $HH \geq 50$ cm.

In certain embodiments of the first aspect of the present invention, $LL \geq 300$ cm, $WW \geq 30$ cm, and $HH \geq 50$ cm.

In certain embodiments of the first aspect of the present invention, the ceramic block comprises calcium at a concentration by weight of [Ca], where [Ca]≤100 ppm, in certain embodiments [Ca]≤80 ppm, in certain embodiments [Ca]≤50 ppm, in certain embodiments [Ca]≤40 ppm.

In certain embodiments of the first aspect of the present invention, the ceramic block comprises zirconium at a concentration by weight of [Zr], where [Zr]≤50 ppm, in certain embodiments [Zr]≤40 ppm, in certain embodiments [Zr]≤30 ppm, in certain embodiments [Zr]≤20 ppm, in certain embodiments [Zr]≤10 ppm.

In certain embodiments of the first aspect of the present invention, the ceramic block comprises aluminum at a concentration by weight of [Al], where [Al]≤60 ppm, in certain embodiments [Al]≤50 ppm, in certain embodiments [Al]≤40 ppm, in certain embodiments [Al]≤30 ppm, in certain embodiments [Al]≤20 ppm.

In certain embodiments of the first aspect of the present invention, the ceramic block is essentially free of alkali metal.

In certain embodiments of the first aspect of the present invention, the ceramic block comprises barium at a concentration by weight of [Ba], where [Ba]≤100 ppm, in certain embodiments [Ba]≤80 ppm, in certain embodiments [Ba]≤50 ppm, in certain embodiments [Ba]≤40 ppm.

In certain embodiments of the first aspect of the present invention, the ceramic block is essentially free of carbon.

A second aspect of the present invention relates to a method for making a ceramic block consisting essentially of substantially homogeneous $(Y_2O_3)_x \cdot P_2O_5$, where $0.95 \leq x \leq 1.05$, having a length LL, a width WW and a height HH, and a volume VV of at least $8 \times 10^{-3}$ m$^3$, essentially free of cracks throughout the volume, a density of at least 95% of the theoretical maximal density of $Y_2O_3 P_2O_5$ under standard conditions, and a creep rate at 1250° C. and 6.89 MPa of CR, where CR≤8.0× $10^{-6}$ hour$^{-1}$, comprising the following steps:

(I) providing a dry powder of $Y_2O_3$ and a dry powder of $P_2O_5$;

(II) mixing the powder of $Y_2O_3$ and the powder of $P_2O_5$ to obtain a uniform powder mixture;

(III) sintering the powder mixture obtained in step (II) in a first furnace to obtain a precursor ceramic material having a composition $(Y_2O_3)_x \cdot P_2O_5$;

(IV) crushing the precursor ceramic material obtained in step (III) to obtain a plurality of particles;

(V) forming a first green body having a volume larger than VV, of the ceramic block by mixing uniformly the plurality of particles obtained in step (IV) with an organic binder;

(VI) isopressing the first green body obtained in step (V) at a pressure of at least 500 MPa to obtain a second green body having a density at standard conditions of at least 60% of the theoretical maximal density of $Y_2O_3 \cdot P_2O_5$ under standard conditions; and (VII) heating the second green body in a second furnace to a temperature of at least 1500° C.

In certain embodiments of the second aspect of the present invention, the method comprises a step (VIII) after step (VII):

(VIII) removing the material within 1.0 cm from the surface of the ceramic block.

In certain embodiments of the second aspect of the present invention, step (VII) comprises:

(VII.1) increasing the temperature of the furnace from 200° C. to 1500° C. at an average temperature elevation rate of not higher than 50° C./hour, in certain embodiments not higher than 40° C./hour, in certain embodiments not higher than 30° C./hour, in certain embodiments not higher than 20° C./hour, in certain embodiments not higher than 10° C./hour; and (VII.2) maintaining the temperature of the furnace at over 1500° C. for at least 100 hours, in certain embodiments at least 200 hours, in certain embodiments at least 300 hours, in certain embodiments at least 400 hours, in certain embodiments at least 500 hours.

In certain embodiments of the second aspect of the present invention, in step (VII), the furnace environment in the second furnace is oxidizing and essentially free of alkali metals.

In certain embodiments of the second aspect of the present invention, in steps (I), (II) and (V), contamination by Al, Ba, Ca and Zr are avoided.

In certain embodiments of the second aspect of the present invention, in step (V), the organic binder is used at an amount of at most 5% by weight of the second green body.

In certain embodiments of the second aspect of the present invention, step (V) comprises the following steps:

(V-1) providing the plurality of particles in the following separate components in the following respective amounts:

(p1) from 15%-35% of particles having a particle size not higher than 45 μm and a median particle size about 2 μm;

(p2) from 15% to 35% of particles having a particle size not higher than 45 μm and a median particle size about 5 μm; and (p3) from 45% to 65% of particles having a particle size from 45 μm to 100 μm;

(V-2) mixing the three components (p1), (p2) and (p3) with a binder uniformly to obtain an admixture; and (V-3) forming the first green body from the admixture obtained in step (V-2).

In certain embodiments of the second aspect of the present invention, step (IV) comprises:

(IV-1) pressing the precursor ceramic obtained in step (III) into large particles;

(IV-2) grinding at least part of the large particles obtained from step (IV-1) into fine particles; and (IV-3) passing the fine particles obtained in step (IV-2) through a magnetic separator to remove metal particles.

In certain embodiments of the second aspect of the present invention, in steps (I), (II), (IV), (V) and (VII), direct contact of the material being handled with CaO-containing, BaO-containing or $ZrO_2$-containing material is avoided.

One or more embodiments and/or aspects of the present disclosure have one or more of the following advantages. First, the large-size $YPO_4$-based ceramic block can be made essentially free of cracks. Second, due to the low concentrations of trace metal contaminants, the ceramic block exhibits an exceedingly low level of creep rate at the high operating temperatures, which can be particularly advantageous for making large-size isopipes, such as those having a length of at least 2000 mm, in certain embodiments at least 3000 mm. Third, owing to the use of the dry synthesis approach, the ceramic block can be made essentially free of water, resulting in excellent creep rate at high temperatures.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

Unless otherwise indicated, all numbers such as those expressing weight percents and mole percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a metal oxide" includes embodiments having one, two or more such metal oxides, unless the context clearly indicates otherwise.

In the present application, the terms xenotime, $YPO_4$ and $Y_2O_3.P_2O_5$ are used interchangeably to mean a yttrium phosphate material. A $YPO_4$-based material is a material comprising primarily of $YPO_4$, with or without excess amount of $Y_2O_3$ or $P_2O_5$ over the stoichiometry required for $YPO_4$, and other minor components as may be found therein.

As used herein, the term $(Y_2O_3)x.P_2O_5$ means a yttrium phosphate material comprising $Y_2O_3$ and $P_2O_5$ wherein the molar ratio of $Y_2O_3$ to $P_2O_5$ is x.

In the present application, the first furnace and the second furnace may be the same or different.

As used herein, the concentration of a given element X, [X], such [Na], is the concentration of the elemental metal relative to the total composition by weight. All percentages and ppm as used herein are by weight, unless specified otherwise.

The overflow down-draw process for making a sheet glass is described in WO03/014032, WO05/081888, and the like, the relevant contents thereof are incorporated herein by reference in their entirety.

Figure 2:
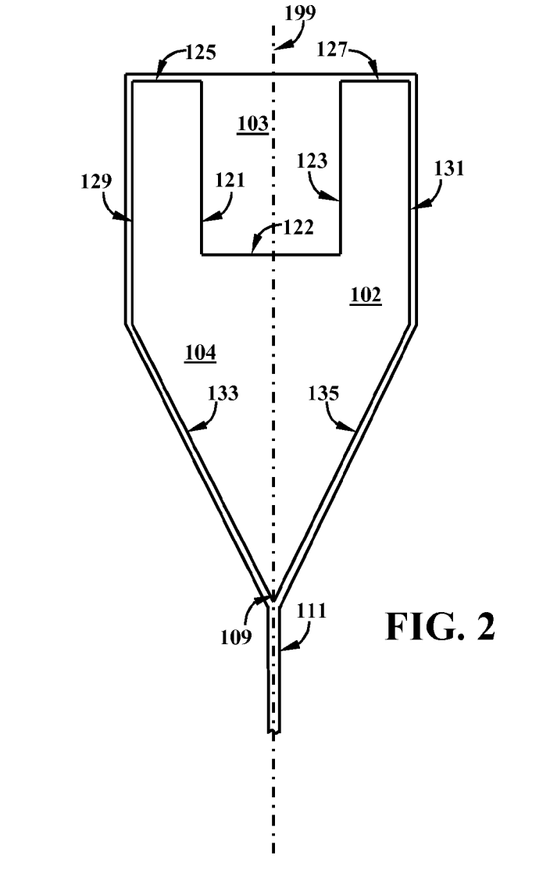
FIG. 2 is a schematic illustration of a cross-section of the isopipe shown in FIG. 1.

FIGS. 1 and 2 schematically illustrate an isopipe assembly 100 during normal operation. The isopipe comprises an upper trough-shaped part 102 and a lower wedge-shaped part 104, which, in combination, form a unitary forming body 100. The trough-shaped part comprises a first internal trough side surface 121, a second internal trough side surface 123 and a trough bottom surface 122, which together define an open channel (also called "trough") 103 into which the glass melt is introduced, typically through an open end thereof. The glass melt is allowed to overflow the first trough top surface 125 of the first trough wall and the second trough top surface 127 of the second trough wall, flow down along a first external trough side surface 129 and a second external trough side surface 131, and further down along a sloping first wedge side surface 133 connecting with the first external trough side surface 129, and a sloping second wedge side surface 135 connecting with the second external trough side surface 131. At the root 109 where the two wedge side surfaces 133 and 135 join, the two glass ribbons fuse to form a unitary glass ribbon 111, which is further drawn down in the direction 113 to a desired thickness, cooled down to elastic state, and then cut into individual glass sheet pieces with desired size. For the purpose of convenient description, a virtual plane 199 having the smallest cumulative difference in distances to (I) the first internal trough side surface 121 of the first trough wall and (II) the second internal trough side surface 123 of the second trough wall is defined as the center plane of the open channel (trough). Thus, if the open channel is symmetrical with respect to a plane passing through the centerline of the trough, the center plane would be the plane with respect to which the two sides of the open channel are symmetrical. Desirably, both the trough-shaped part and the wedge-shaped part are symmetrical with respect to the center plane of the open channel. In such scenario, the center plane 199 would also pass through the root line 109 of the isopipe.

WO06/073841 and WO09/108,298 disclose $YPO_4$-based materials and processes for making them, as well as the use of such materials for isopipes, the contents of both are incorporated herein by reference in their entirety. The isopipe is the center of an overflow down-draw process for making glass sheet. Thus its geometric stability is very important for making glass sheets with consistent thickness and thickness variation over a long production campaign. Since the isopipe is a long object typically operating at an elevated temperature, e.g., at about 1200° C. for prolonged periods of time while supported only at the ends, the isopipe is subjected to creeping, i.e., geometric deformation due to the weight of the isopipe and the glass melt it contains. Stringent requirements are imposed on the refractory materials for making the isopipe. Such requirements are well documented in the prior art references such as WO06/073841 and WO09/108,298 mentioned supra.

A large, continuous and unitary block of ceramic material having substantially homogeneous composition and physical properties throughout its volume is desired to fabricate a single isopipe forming body. Hitherto no $YPO_4$-based ceramic block having a volume of over $5 \times 10^{-3}$ $m^3$ with suitable composition and properties for an isopipe has been reported. This is due primarily to the difficulties in fabricating such large ceramic blocks with such stringent property requirements, especially a low creep rate at an elevated temperature such as 1250° C. Given the refractoriness of $YPO_4$, the fabrication of such block would necessarily require a relatively long step of high-temperature treatment. Further, a plurality of steps are required during each of which a number of factors would affect the final composition, composition homogeneity, contamination level, microstructure, stress distribution, and the like, hence the final composition and properties of the ceramic block.

Through extensive research and development effort, the present inventors have successfully made large $YPO_4$-based ceramic blocks having a volume of at least $8 \times 10^{-3}$ $m^3$, low level of contaminants and properties especially creep rate at 1250° C. that meets the requirements of an isopipe for making large-size glass sheets. Both the large ceramic block and the process for making such ceramic blocks, among others, constitutes the various aspects of the present invention. The ceramic block is characterized by a creep rate at 1250° C. and 6.89 MPa of CR, where $CR \leq 8.0 \times 10^{-6}$ hour$^{-1}$, in certain embodiments $CR \leq 7.0 \times 10^{-6}$ hour$^{-1}$, in certain embodiments $CR \leq 6.0 \times 10^{-6}$ hour$^{-1}$, in certain embodiments $CR \leq 5.0 \times 10^{-6}$ hour$^{-1}$, in certain embodiments $CR \leq 4.0 \times 10^{-6}$ hour$^{-1}$, in certain embodiments $CR \leq 3.0 \times 10^{-6}$ hour$^{-1}$, in certain embodiments $CR \leq 2.0 \times 10^{-6}$ hour$^{-1}$.

The chemical composition of the ceramic block is substantially uniform, i.e., the major components $Y_2O_3$ and $P_2O_5$ are distributed substantially uniformly throughout the full volume of the bulk. Thus, the material constituting the ceramic block may comprise essentially a single phase, such as the $YPO_4$ phase, through the bulk in certain embodiments. However, it is possible that the material may comprise multiple phases that are all substantially uniformly distributed inside the bulk. For example, the material constituting the ceramic block may comprise, in addition to a main $YPO_4$ phase, a minor $Y_2O_3$ phase distributed substantially uniformly in the $YPO_4$ phase. Trace amounts of impurities, as mentioned infra, such as $Al_2O_3$, $BaO$, $B_2O_3$, $CaO$, $MgO$, $MnO$, $ZrO_2$, and the like, may be present in the bulk at various amounts. Since they are typically present at a very low concentrations, as described supra, the distribution thereof may exhibit an irregular pattern. For example, the concentration of sodium, [Na], may be higher in the vicinity of the surface of the ceramic block, and lower in regions far from the surface of the block, due to the high-temperature diffusion of sodium in furnaces from the surface to the center.

The chemical composition of the ceramic block may be represented by a formula $(Y_2O_3)_x \cdot P_2O_5$, where x is the molar ratio between $Y_2O_3$ and $P_2O_5$, and $0.95 \leq x \leq 1.05$. Thus the material may be a stoichiometric $YPO_4$ material, or may comprise excess amount of $Y_2O_3$ or $P_2O_5$. Nonetheless, it is more advantageous that the $Y_2O_3$ molar amount is not lower than $P_2O_5$, thus it is desired that $1.00 \leq x \leq 1.05$, in certain embodiments $1.00 \leq x \leq 1.03$, in certain other embodiments $1.00 \leq x \leq 1.02$. This is because excessive $P_2O_5$ can lower the melting temperature of $YPO_4$ faster than the same amount of $Y_2O_3$.

The dimensions of the ceramic block can be described in terms of length LL, width WW and height HH. In certain embodiments, the block advantageously has a large size where $LL \geq 20$ cm, $WW \geq 20$ cm, and $HH \geq 20$ cm. The block can be a full solid block having a cubic, cuboidal, spherical, spheroidal, or other geometry. The block may take the shape of an isopie, i.e., one comprising a trough-shaped top part and a wedge-shaped bottom part connected with each other. The block can advantageously have a shape where $LL \geq 50$ cm, $WW \geq 30$ cm, and $HH \geq 50$ cm. For larger size isopies, the block may have a length $LL \geq 100$ cm, in certain embodiments $LL \geq 200$ cm, in certain other embodiments $LL \geq 300$ cm.

One of the interesting findings in the extensive research and development efforts by the present inventors is the low contaminant concentrations, especially [Ca], [Zr] and [Al], in the ceramic body of the present invention. Such low levels of contamination, among other factors, gave rise to the low creep rate at 1250° C. and 6.89 MPa. In certain embodiments, the ceramic block of the present invention advantageously comprises calcium at a concentration by weight of [Ca], where $[Ca] \leq 100$ ppm, in certain embodiments $[Ca] \leq 80$ ppm, in certain embodiments $[Ca] \leq 50$ ppm, in certain embodiments $[Ca] \leq 40$ ppm. In certain embodiments, the ceramic block of the present invention advantageously comprises zirconium at a concentration by weight of [Zr], where $[Zr] \leq 50$ ppm, in certain embodiments $[Zr] \leq 40$ ppm, in certain embodiments $[Zr] \leq 30$ ppm, in certain embodiments $[Zr] \leq 20$ ppm, in certain embodiments $[Zr] \leq 10$ ppm. In certain embodiments, the ceramic block of the present invention advantageously comprises aluminum at a concentration by weight of [Al], where $[Al] \leq 60$ ppm, in certain embodiments $[Al] \leq 50$ ppm, in certain embodiments $[Al] \leq 40$ ppm, in certain embodiments $[Al] \leq 30$ ppm, in certain embodiments $[Al] \leq 20$ ppm. In certain embodiments, the ceramic block of the present invention advantageously comprises barium at a concentration by weight of [Ba], where $[Ba] \leq 100$ ppm, in certain embodiments $[Ba] \leq 80$ ppm, in certain embodiments $[Ba] \leq 50$ ppm, in certain embodiments $[Ba] \leq 40$ ppm. In certain embodiments, the ceramic block of the present invention is advantageously characterized by the sum total of [Al], [B], [Ba], [Ca], [Fe], [Hf], [K], [Li], [Mg], [Mn], [Na] and [Zr] being at most 500 ppm by weight, in certain embodiments at most 400 ppm by weight, in certain other embodiments at most 300 ppm by weight, in certain other embodiment at most 200 ppm by weight, in certain other embodiments at most 100 ppm by weight. Making a large $YPO_4$-based ceramic body having such low levels of contaminants is by no means an easy undertaking due to the multi-step process required, the large volume of materials that have to be handled, and the high temperature steps needed. On the other hand, the successful synthesis of a ceramic block with such low levels of concentration of contaminants resulted in the excellent properties thereof, especially the low creep rate at high temperatures such as 1250° C. at 6.89 MPa.

In addition to the lack of metal contaminants, the refractory block of the present invention is further advantageously characterized by a low level of carbon in certain embodiments. Carbon can be entrapped in any dense material made by sintering because organic matters can be introduced into the material prior to firing, either unintentionally due to material handling issues or intentionally because organic binders are used widely in processes for making them. The existence of carbon can affect the mechanical properties of the ceramic block of the present invention, and causes undesired outgassing during normal use thereof.

The ceramic block of the present invention can be advantageously used for handling alkali-free glass materials aimed for applications in opto-electronic devices, such as the glass substrates for a LCD display. For example, the ceramic block can be formed into a large-size isopipe used in overflow down-draw processes for making aluminosilicate glass-based LCD glass substrates. For these applications, it is highly desired that the ceramic block is essentially free of alkali metal ions, because such ions are particularly detrimental to semiconductor manufacture processes which will be conducted on the glass substrates. By "essentially free" as used herein is meant that the ceramic block comprises, by weight, at most 5 ppm of any alkali metal. In certain embodiments, the ceramic block of the present invention advantageously comprises at most 3 ppm, even more advantageously at most 1 ppm, of any alkali metal.

The ceramic block of the present invention advantageously exhibits a nominal density of at least 85%, in certain embodiments at least 87%, in certain embodiments at least 89%, in certain embodiments at least 90%, in certain embodiments at least 93%, in certain embodiments at least 95%, in certain embodiments at least 97%, of the theoretical density of $YPO_4$ under standard conditions (1 atmosphere pressure, 0° C.). The theoretical density of $YPO_4$ under standard conditions is typically considered as being 4.27 g·cm$^{-3}$. The higher the density of the ceramic block, the lower the porosity thereof. Given that the ceramic block comprises multiple grains, a certain level of porosity is expected to exist in the grain boundaries. The porosity at the grain boundary can significantly affect the mechanical properties of the ceramic block, such as, e.g., creep rate at an elevated temperature and modulus of rupture (MOR) at room temperature and at the elevated operating temperature.

The ceramic block of the present invention further exhibits a low level of cracks in the crystalline grains inside the bulk. It is believed that the existence of a high level of micro-cracks in the micro-structure of the ceramic block can reduce the MOR of the material and creep rate under operating conditions. Such micro-cracks can propagate under load and stress to a critical dimension, leading to material failure.

The ceramic block of the present invention is further characterized by a low water content. Water in the ceramic block of the present invention can take various forms, e.g., free water present in $H_2O$ form trapped at the grain boundary, or in the form of OH bonded to the surface or bulk of the material and/or the crystal grains. Without intending to be bound by a particular theory, it is believed that the existence of water inside the bulk of the material can cause the formation of micro-cracks and propagation thereof under high operating temperatures. Therefore, it is desired that the total $H_2O$ content in the ceramic block in certain embodiments be at most 300 ppm by weight, in certain other embodiments at most 200 ppm by weight, in certain other embodiments at most 100 ppm by weight, in certain other embodiments at most 50 ppm by weight.

The ceramic block of the present invention having the advantageous composition and properties enumerated supra can be made by a carefully controlled synthesis method of the present invention. It is believed that such large, high-purity, high-performance ceramic material cannot be found in nature, and therefore has to be synthesized. As mentioned supra, due to the high melting point of $YPO_4$, a high-temperature step would be unavoidable to make the ceramic block of the present invention. On the other hand, due to the high melting point of $YPO_4$, directly forming such large block by melting the precursor material into a fluid followed by cooling as is typically used in forming glass materials and some crystalline materials would be impractical. Thus, the present invention utilizes a sintering method, i.e., by heating a plurality of densely packed precursor particles having the intended final composition into a densified ceramic body containing multiple crystal grains.

As mentioned supra, the existence of large amount of $H_2O$ in the ceramic block of the present invention can lead to compromised mechanical properties. Therefore, the synthesizing method of the present invention for making the large-size block includes a first step of forming a precursor ceramic material using a "dry" synthesis approach, i.e., by reacting anhydrous $P_2O_5$ with dry $Y_2O_3$ in the desired amounts to form the precursor material with the desired end composition. It is to be understood that during the reaction of the first step, to expedite the reaction, it is desired that the reactants are heated to an elevated temperature such as at least 300° C., in certain embodiments at least 400° C., in certain other embodiments at least 500° C., in certain other embodiments at least 600° C. To reduce volatility loss of $P_2O_5$, it is desired that the two powders are intimately mixed to form a substantially homogenous mixture before being heated to an elevated temperature, and that the reaction is conducted in a substantially closed container to prevent leakage of $P_2O_5$ gas. Moreover, due to the highly hygroscopic nature of $P_2O_5$, it is desired that $P_2O_5$ is handled in a substantially dry atmosphere and the exposure thereof to the ambient is limited to as short a time as required only. To achieve a low level of metal contaminants, it is desired that raw materials of $Y_2O_3$ and $P_2O_5$ are as pure as possible, and the handling of both raw materials do not introduce the unwanted metals. This requires the use of very clean containers made of materials that are substantially inert to $Y_2O_3$ and $P_2O_5$ even at the elevated reaction temperatures.

The present inventors conducted the synthesis of a large-size $YPO_4$-based ceramic block using various methods, including using precursor $(Y_2O_3)_x \cdot P_2O_5$ particles made by a "wet" synthesis approach, i.e., by reacting $Y_2O_3$ or precursor materials thereof (such as $Y(OH)_3$) with liquid $H_3PO_4$ or a solution thereof to obtain a precursor ceramic material. Even if very pure raw materials were used and the handling thereof was carefully controlled to avoid the introduction of contaminants, all other conditions being equal, a large-size $YPO_4$-based ceramic block with a low level of creep rate at 1250° C. essentially free of visible cracks could not be successfully made using the wet synthesis approach. Without intending to be bound by a particular theory, the present inventors believes such failure of the "wet" synthesis approach was due in part to the large amount of water introduced into the precursor ceramic material particles, which is detrimental to the final properties of the sintered ceramic block.

Upon complete sintering in step (III), the $Y_2O_3$ and $P_2O_5$ raw material are substantially completely reacted to form a network material where both components are substantially evenly distributed throughout the precursor material. However, such precursor material typically does not have the required porosity and mechanical properties for use in an isopipe. Hence there is the need of subsequent steps (IV), (V), (VI) and (VII).

To obtain the final ceramic block of the present invention exhibiting a low level of metal contaminants, it is desired that in steps (I), (II), (IV), (V) and (VII), direct contact of the material being handled with $Al_2O_3$-containing, CaO-containing, BaO-containing or $ZrO_2$-containing material is avoided.

Thus, for example, in step (IV), when the precursor ceramic material is crushed to make the particles, it is desired that a grinding medium free of $Al_2O_3$, CaO, and BaO is used.

The crushed particles made in step (IV) is typically separated into multiple fractions having differing mean particle sizes, which, with or without further, separate, grinding, will be mixed at different amounts in step (V) in order to obtain a first green body having the desired particle packing, particle density and green body strength.

To obtain a strength of the first green body that can withstand the subsequent handling, an organic binder is typically used. Such organic binder may include, e.g., poly(meth)acrylates, METHOCEL, and the like. As mentioned supra, the use of organic binders in the green body can result in a residual level of carbon in the final ceramic block, which can be detrimental to the final sintering step (VII) and the final mechanical properties of the ceramic block. Thus, it is desired that the total amount of binders used in step (V) is at most 5% by weight of the first green body, in certain embodiments at most 3%, in certain other embodiments at most 2%, in certain other embodiments at most 1%.

It was found that the nominal density of the second green body formed in step (VI) affects the final nominal density of the ceramic block upon completion of step (VII), and hence the mechanical properties thereof. It is desired that the density of the second green body is at least 60% of the theoretical density of $YPO_4$ crystals under standard conditions, in certain embodiments at least 63%, in certain other embodiments at least 65%, in certain other embodiments at most 67%, in certain other embodiments at least 69%, in certain other embodiments at least 70%.

Dense packing of the particles in steps (V) and (VI) are needed to achieve a high nominal density of the first and second green bodies. To achieve a dense packing, the particles are desired to have a particle distribution facilitating packing thereof. To that end, in step (V), the particles can comprise the following components:

(p1) from 15%-35% of particles having a particle size not higher than 45 µm and a median particle size about 2 µm;

(p2) from 15% to 35% of particles having a particle size not higher than 45 µm and a median particle size about 5 µm; and (p3) from 45% to 65% of particles having a particle size from 45 µm to 100 µm.

In an exemplary process, a large bulk of the precursor ceramic material is crushed by using a metal plate into large particles, and then sifted into three parts, a first part having particle size not lower than 100 µm, a second part having a particle size not higher than 100 µm but not lower than 45 µm, and a third part having particle size not higher than 45 µm. The second part is used as p3 above. The third part is then divided into two subparts, Subpart I and Subpart II. Subpart I is further ground to have a median particle size of 2 µm and used as p1; and Subpart II is further ground to have a median particle size of 5 µm and used as p2. The existence and amount of the fine component p1, medium component p2 and the coarse component p3, above, can ensure a substantially dense packing of the particles in step (VI). Furthermore, this distribution would result in a desirable crystal grain size distribution in the final ceramic block, which is desired for the intended MOR and creep rate and other mechanical properties of an isopipe.

The particles with the desired particle size distribution and amounts and the binder material are then mixed thoroughly and uniformly with each other, put into a flexible bag, which can be vacuumed and shaken to allow compaction, and then sealed for isopressing in step (VI).

In step (VI), the first green body is subject to a high pressure isopressing process. The purpose of this step includes, inter alia, densifying the first green body to obtain a second green body with a high nominal density, and to achieve an isotropic density profile throughout the second green body. An anisotropic density profile of the second green body would be detrimental to the final properties of the final ceramic block, as an isotropic density profile of the final ceramic block would be highly desired for the final ceramic block as well. The isopressing is typically carried out in a machine called isopress which comprises a container and a fluid that can be pressurized to as high as 124 MPa (18000 psi). The first green body in a sealed bag is then placed into the fluid, and pressurized from all directions to a pressure of at least 50 MPa, in certain embodiments at least 80 MPa, in certain other embodiments at least 100 MPa, in certain other embodiments at least 120 MPa.

The temperature profile of the final sintering step (VII) significantly impacts the final properties and composition of the ceramic block. If the temperature rises too fast, a high thermal gradient will occur from the surface to the core of the second green body, resulting in substantial thermal stress that could crack the second green body before the end of step (VII). In addition, too steep a temperature rising curve can cause undesirable early-stage closure of the pores in the vicinity of the surface, resulting in the entrapment of water, carbon, carbon monoxide and carbon dioxide inside the ceramic body, causing undesired properties and/or later-stage cracking due to pressure built-up from these gaseous species. Therefore, it is desired that step (VII) comprises the following:

(VII.1) increasing the temperature of the furnace from 200° C. to 1500° C. at an average temperature elevation rate of not higher than 50° C./hour, in certain embodiments not higher than 40° C./hour, in certain embodiments not higher than 30° C./hour, in certain embodiments not higher than 20° C./hour, in certain embodiments not higher than 10° C./hour; and (VII.2) maintaining the temperature of the furnace at over 1500° C. for at least 100 hours, in certain embodiments at least 200 hours, in certain embodiments at least 300 hours, in certain embodiments at least 400 hours, in certain embodiments at least 500 hours.

Thus, in step (VII.1), due to the slow temperature elevation rate, the second green body is subjected to a low temperature gradient from the surface to the core, and it is allowed to degas through the open pores which close slowly, reducing the entrapment of water and carbon-based contaminants as well as the chance of cracking due to thermal gradient. In order to remove the organic materials substantially completely, it is desired that at least in the initial stage of step (VII), the sintering is carried out in an oxidizing environment, such as air, so that the organic materials can be oxidized substantially completely and removed from the bulk of the green body before the full consolidation thereof.

During the final step of sintering, the second green body densifies by eliminating the porosities. Such densification is manifested by the reduction of volume, i.e., shrinkage. The higher the nominal density of the second green body, the lower the total shrinkage of the second green body at the end of the sintering step to achieve a given final density of the ceramic block. The initial speed of shrinking is largely determined by the temperature of the green body. The higher the initial temperature, the faster the shrinking speed the second green body will see. However, the higher the initial furnace temperature, the more likely a large temperature gradient from the surface to the core of the second green body will result. As mentioned supra, a slow temperature elevation rate, especially at the beginning stage of the sintering step, is beneficial to reducing detrimental thermal gradient, and to reducing the initial shrinking speed of the second green body. Therefore, the amount of shrinkage as well as the shrinking speed both can impact the final porosity, density and properties of the ceramic block.

To accommodate the shrinkage of the second green body during sintering, which can be quite significant for a large second green body, it is desired that the second green body is positioned on a set up of separated rollers with or without fixed axles. Thus, when the surface of the second green body moves as a result of the bulk shrinkage, the rollers will roll to accommodate the movement of the surface, thereby reducing the drag and frictional force exerted to the green body, allowing a complete densification without undesirable external interferences. As mentioned supra, during the sintering step, it is desirable that the second green body is free from direct contact with contaminant-containing materials. To that end, the rollers may be covered, e.g., by a layer of platinum as a barrier against migration of contaminants to the surface thereof. In general, to avoid the formation of cracks and to obtain desirable creep rate and other mechanical properties, the initial linear shrinkage speed of the second green body in a direction substantially perpendicular to the gravity vector is advantageously controlled to less than 10 mm/hour, in certain embodiments less than 8 mm/hour, in certain other embodiments less than 5 mm/hour, in certain other embodiments less than 3 mm/hour, during the first 100 hours of the heating process of the second green body to raise its temperature from 200° C. to 1500° C. Further, the initial linear shrinkage speed of the second green body in a direction substantially perpendicular to the gravity vector is advantageously controlled to less than 5%/hour, in certain embodiments less than 4%/hour, in certain other embodiments less than 3%/hour, in certain other embodiments less than 2%/hour, during the first 100 hours of the heating process of the second green body to raise its temperature from 200° C. to 1500° C.

Due to the refractoriness of the ceramic material used for the ceramic block of the present invention, it is desired that in step (VII), the second green body is held at a temperature higher than 1600° C. for a period of at least 24 hours, in certain embodiments at least 72 hours, in certain embodiments at least 144 hours, in certain other embodiments at least 240 hours, in certain other embodiments at least 360 hours, and still in certain other embodiments at least 480 hours to allow for complete densification and the desired final density.

At the end of the sintering step (VII), after the second green body has been substantially completely densified, it is allowed to cool down at a low cooling rate, e.g., not over 200° C./hour from 1600° C. to 200° C., in certain embodiments advantageously not over 100° C./hour, in certain other embodiments advantageously not over 50° C./hour, in certain other embodiments advantageous not over 10° C./hour, so that the cooling does not result in a substantial thermal gradient inside the bulk of the ceramic block, which can cause cracking. It is also desirable that, after being cooled down to room temperature, the skin layer of the ceramic block, having a depth of 1 cm, or 2 cm, or even 3 cm, be removed, as the skin layer can comprise a disproportionately high level of alkali metals such as sodium, potassium, and the like.

The present invention will be further illustrated by the following non-limiting examples and comparative examples.

EXAMPLES

A plurality of $YPO_4$-based ceramic rods were made and characterized for properties. All examples, made from stoichiometric batch materials, are believed to have chemical compositions equal or close to stoichiometric $YPO_4$. Examples 7 and 8 were made by the dry process using anhydrous $P_2O_5$ and $Y_2O_3$ as the raw materials for synthesizing the precursor ceramic material. Examples 1, 2, 3, 4, 5, 6, 9 and 10 were made by using a wet process, i.e., using $Y_2O_3$ and $H_3PO_4$ as the raw materials for synthesizing the precursor ceramic material.

The rods were then measured for creep rate (CR) at 1180° C. and 6.89 MPa, and CR at 1250° C. at 6.89 MPa, respectively. Data of the creep rates are reported in TABLE I, below.

TABLE I

| | | Example No. | | | | | | | | | |
|---|---|---|---|---|---|---|---|---|---|---|---|
| | | 1 | 2 | 3 | 4 | 5 | 6 | 7 | 8 | 9 | 10 |
| CR @ 1180° C. ($\times 10^{-7}$ $hour^{-1}$) | Series 1 | 2.82 | 2.62 | 2.99 | 1.82 | 2.41 | 3.13 | 0.918 | 1.03 | 4.13 | 5.83 |
| | Series 2 | 3.07 | 4.67 | 4.32 | 3.76 | 3.65 | 3.96 | 0.899 | 0.853 | 4.27 | 6.69 |
| | Average | 2.94 | 3.64 | 3.66 | 2.79 | 3.03 | 3.54 | 0.908 | 0.942 | 4.20 | 6.26 |
| CR @ 1250° C. ($\times 10^{-7}$ $hour^{-1}$) | | 11.1 | 14.1 | 12.3 | 9.38 | 7.39 | 10.8 | 1.69 | 1.21 | 37.4 | 38.0 |

The rods where further measured of concentrations of contaminant metals. The results are reported in TABLE II, below.

TABLE II

| Example No. | [Al] | [B] | [Ba] | [Ca] | [Fe] | [Hf] | [K] | [Li] | [Mg] | [Mn] | [Na] | [Zr] |
|---|---|---|---|---|---|---|---|---|---|---|---|---|
| 1 | 75 | 5 | 3 | 130 | 67 | 0.6 | <5 | 2 | 12 | <1 | 11 | 30 |
| 2 | 60 | 2 | 3 | 120 | 71 | 2 | <5 | 2 | 13 | <1 | 4 | 80 |
| 3 | 53 | 2 | 3 | 100 | 64 | 1 | <5 | 2 | 19 | <1 | 6 | 42 |
| 4 | 54 | 2 | 4 | 110 | 66 | 3.5 | <5 | 2 | 14 | <1 | 4 | 130 |
| 5 | 66 | <1 | 2 | 130 | 77 | 0.6 | <5 | 3 | 13 | <1 | 14 | 29 |
| 6 | 79 | <1 | 4 | 140 | 31 | 1.9 | <5 | 3 | 15 | <1 | 29 | 95 |
| 7 | 19 | <1 | <1 | 10 | 18 | 0.5 | <5 | 3 | 3 | <1 | 4 | 29 |
| 8 | 20 | <1 | <1 | 11 | <1 | 0.1 | <5 | 2 | 3 | <1 | 7 | 9 |
| 9 | 87 | <1 | 6 | 140 | 95 | 7.5 | <5 | 2 | 28 | <1 | 26 | 350 |
| 10 | 200 | <1 | 2 | 120 | 32 | 9.9 | <5 | 1 | 35 | <1 | 21 | 450 |

Figure 3:
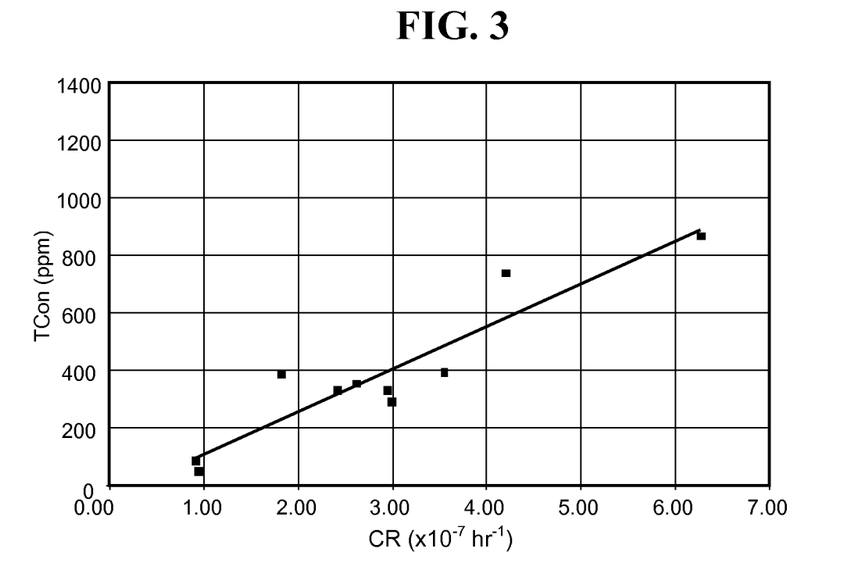
FIG. 3 is a diagram showing the relationship between the creep rate at 1180° C. and 6.89 MPa of a series of ceramic materials and the sum total of the concentration of the metal contaminants.
Figure 4:
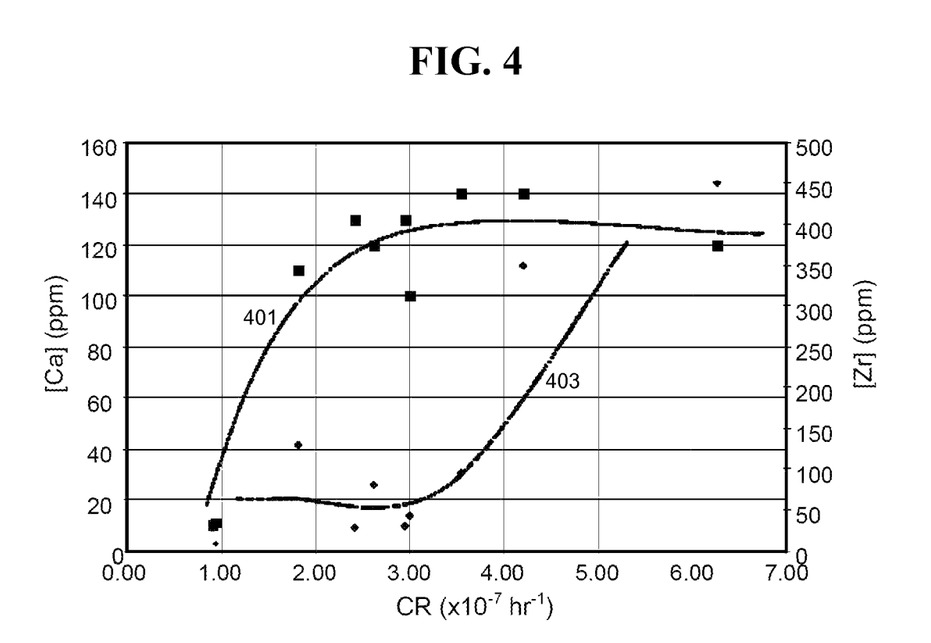
FIG. 4 is a diagram showing the relationship between the creep rate at 1180° C. and 6.89 MPa of a series of ceramic materials and [Ca] and [Zr] thereof.

As is clear, Example Nos. 7 and 8, both of the present invention, exhibit the lowest level of creep rates at both 1180° C. and 1250° C., and the lowest levels of [Al], [Ba], [Ca], [Mg] and [Zr]. A diagram showing the relationship between the creep rate at 1180° C. and 6.89 MPa and the sum total of the concentrations of contaminants [Al]+[B]+[Ba]+[Ca]+[Fe]+[Hf]+[K]+[Li]+[Mg]+[Mn]+[Na]+[Zr] is shown in FIG. 3. Shown on the vertical axis is the sum total of the concentrations of these metals, and on the horizontal axis the creep rate at 1180° C. This figure clearly shows that the creep rate has a strong positive correlation with the sum total of the concentrations of these contaminants. In FIG. 4, the relationship between [Ca] and [Zr] and the creep rate at 1180° C. for these examples are shown with curve 401 and the left vertical axis show the impact of [Ca], and curve 403 and the right vertical axis show that of [Zr]. The data points with the lowest creep rates in both FIGS. 3 and 4 are for Example Nos. 7 and 8, described supra.

Based on the above learnings, a number of additional examples according to the present invention, i.e., using the "dry" approach to synthesize the precursor ceramic material but with slightly different particle distribution of the particles used for making the first and second green body. The details the particle distributions of these examples are provided in TABLE III below:

TABLE III

| Example No. | Composition of batch mixture | | | Relative green density of the second green body (%) |
|---|---|---|---|---|
| | Component 1 (%) | Component 2 (%) | Component 3 (%) | |
| 11 | 45 | 25 | 30 | 68.8 |
| 12 | 45 | 30 | 25 | 69.2 |
| 13 | 50 | 35 | 15 | 69.8 |
| 14 | 50 | 30 | 20 | 69.8 |
| 15 | 50 | 25 | 25 | 69.5 |
| 16 | 55 | 25 | 20 | 69.7 |
| 17 | 55 | 20 | 25 | 70.7 |

In above TABLE III, component 1 has a particle size of from 45-100 µm, component 2 has a median particle size of about 5 µm, and component 3 has a mean particle size of about 2 µm, where all particles of the components 2 and 3 are smaller than 45 µm. Experiments showed that examples 14 and 17 had the highest performance in terms of creep rate at 1180° C. The materials were then used for making the green body of large-size ceramic blocks having a size of about 50 cm×50 cm×20 cm.

Figure 5:
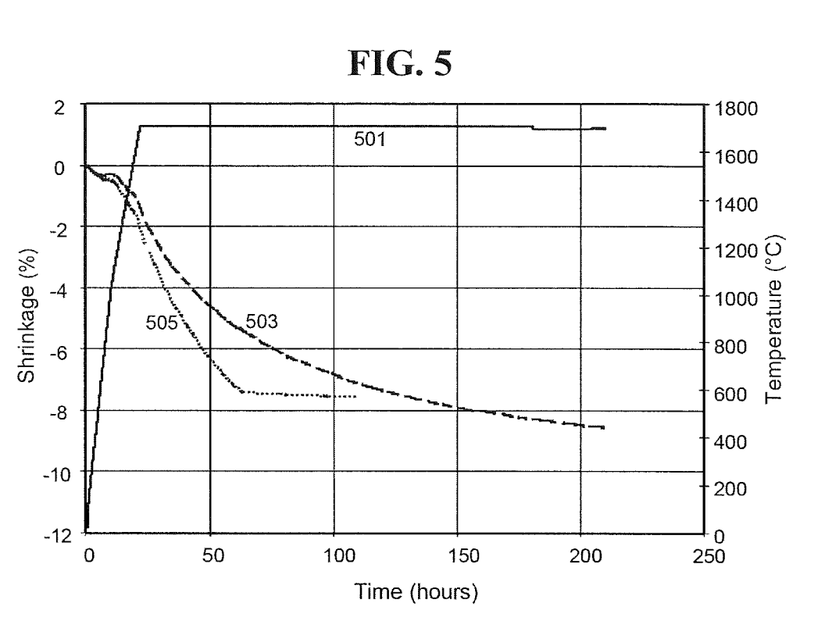
FIG. 5 is a diagram showing the temperature profiles of two examples according to the present invention in the final sintering step and the measured dynamic shrinkage of the second green bodies during the sintering step.

FIG. 5 shows the sintering temperature profiles 505, 503 of Examples 14 and 17, respectively, and shows the actual temperature profile 501 over the same time period.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A method for making a ceramic block consisting essentially of substantially homogeneous $(Y_2O_3)_x \cdot P_2O_5$, where $0.95 \leq x \leq 1.05$, having a length LL, a width WW and a height MI, and a volume VV of at least $8 \times 10^{-3} m^3$, essentially free of cracks throughout the volume, a density of at least 85% of the theoretical maximal density of $Y_2O_3 \cdot P_2O_5$ under standard conditions, and a creep rate at 1250° C. and 6.89 MPa of CR, where CR $\leq 8.0 \times 10^{-6}$ hour$^{-1}$, comprising the following steps:
(I) providing a dry powder of $Y_2O_3$ and a dry powder of $P_2O_5$;
(II) mixing the powder of $Y_2O_3$ and the powder of $P_2O_5$ to obtain a uniform powder mixture;
(III) sintering the powder mixture obtained in step (II) in a first furnace to obtain a precursor ceramic material having a composition $(Y_2O_3)_x \cdot (P_2O_5)$;
(IV) crushing the precursor ceramic material obtained in step (III) to obtain a plurality of particles;
(V) forming a first green body having a volume larger than VV, of the ceramic block by mixing uniformly the plurality of particles obtained in step (IV) with an organic binder;
(VI) isopressing the first green body obtained in step (VII) at a pressure of at least 50 MPa to obtain a second green body having a density at standard conditions of at least 60% of the theoretical maximal density of $Y_2O_3 \cdot P_2O_5$ under standard conditions; and
(VII) heating the second green body in a second furnace to a temperature of at least 1500° C.,
wherein step (VII) comprises:
(VII.1) increasing the temperature of the furnace from 200° C. to 1500° C. at an average temperature elevation rate of not higher than 50° C/hour; and
(VII.2) maintaining the temperature of the furnace at over 1500° C. for at least 100 hours.

2. A method according to claim 1, wherein in step (VI), the second green body has a density of at least 65% of the theoretical maximal density of $Y_2O_3 \cdot P_2O_5$ under standard conditions.

3. A method according to claim 1, further comprising a step (VIII) after step (VII):
(VIII) removing the material within 1.0 cm from a surface of the ceramic block.

4. A method according to claim 1, wherein the linear shrinkage speed of the second green body is controlled to below 5%/hour in a direction perpendicular to the gravity vector.

5. A method according to claim 1, wherein in steps (III) and (VII), the first and second furnace are oxidizing and essentially free of alkali metals.

6. A method according to claim 1, wherein in steps (I), (II) and (V), contamination by Al, Ba, Ca and Zr are avoided.

7. A method according to claim 1, wherein in step (V), the organic binder is used at an amount of at most 5% by weight of the second green body.

8. A method according to claim 1, wherein step (V) comprises:
(V-1) providing the plurality of particles in the following separate components in the following respective amounts:
(p1) from 15% - 35% of particles having a particle size not higher than 45 µm and a median particle size about 2 µm;
(p2) from 15% to 35% of particles having a particle size not higher than 45 µm and a median particle size about 5 µm; and
(p3) from 45% to 65% of particles having a particle size of from 45 µm to 100µm;
(V-2) mixing the three components (p1), (p2) and (p3) with another binder uniformly to obtain an admixture; and
(V-3) forming the first green body from the admixture obtained in step (V-2).

9. A method according to claim 1, wherein in steps (I), (II), (IV), (V) and (VII), direct contact of the material being handled with CaO-containing, BaO-containing or $ZrO_2$-containing material is avoided.

10. A method according to claim 1, wherein step (IV) comprises:
(IV-1) pressing the precursor ceramic obtained in step (III) into large particles;
(IV-2) grinding at least part of the particles obtained from step (IV-1) into second particles; and
(IV-3) passing the second particles obtained in step (IV-2) through a magnetic separator to remove metal particles.

11. A method for making a ceramic block consisting essentially of substantially homogeneous $(Y_2O_3)_x \cdot P_2O_5$, where $0.95 \leq x \leq 1.05$, having a length LL, a width WW and a height HH, and a volume VV of at least $8 \times 10^{-3} m^3$, essentially free of cracks throughout the volume, a density of at least 85% of the theoretical maximal density of $Y_2O_3 \cdot P_2O_5$ under standard conditions, and a creep rate at 1250° C. and 6.89MPa of CR, where CR $\leq 8.0 \times 10^{-6}$ hour$^{-1}$, comprising the following steps:

(I) providing a dry powder of $Y_2O_3$ and a dry powder of $P_2O_5$;

(II) mixing the powder of $Y_2O_3$ and the powder of $P_2O_5$ to obtain a uniform powder mixture;

(III) sintering the powder mixture obtained in step (II) in a first furnace to obtain a precursor ceramic material having a composition $(Y_2O_3)_x.P_2O_5$;

(IV) crushing the precursor ceramic material obtained in step (III) to obtain a plurality of particles;

(V) forming a first green body having a volume larger than VV, of the ceramic block by mixing uniformly the plurality of particles obtained in step (IV) with an organic binder;

(VI) isopressing the first green body obtained in step (VII) at a pressure of at least 50 MPa to obtain a second green body having a density at standard conditions of at least 60% of the theoretical maximal density of $Y_2O_3.P_2O_5$ under standard conditions; and (VII) heating the second green body in a second furnace to a temperature of at least 1500° C., wherein step (V) comprises:

(V-1) providing the plurality of particles in the following separate components in the following respective amounts:

(p1) from 15% - 35% of particles having a particle size not higher than 45 μm and a median particle size about 2 μm;

(p2) from 15% to 35% of particles having a particle size not higher than 45 μm and a median particle size about 5 μm; and (p3) from 45% to 65% of particles having a particle size of from 45 μm to 100μm;

(V-2) mixing the three components (p1), (p2) and (p3) with another binder uniformly to obtain an admixture; and (V-3) forming the first green body from the admixture obtained in step (V-2).

12. A method according to claim 11, wherein in step (VI), the second green body has a density of at least 65% of the theoretical maximal density of $Y_2O_3.P_2O_5$ under standard conditions.

13. A method according to claim 11, wherein in steps (III) and (VII), the first and second furnace are oxidizing and essentially free of alkali metals.

14. A method according to claim 11, wherein in steps (I), (II) and (V), contamination by Al, Ba, Ca and Zr are avoided.

15. A method for making a ceramic block consisting essentially of substantially homogeneous $(Y_2O_3)_x.P_2O_5$, where $0.95 \le x \le 1.05$, having a length LL, a width WW and a height HE, and a volume VV of at least $8;\times 10^{-3}$ m³, essentially free of cracks throughout the volume, a density of at least 85% of the theoretical maximal density of $Y_2O_3.P_2O_5$ under standard conditions, and a creep rate at 1250° C. and 6.89 MPa of CR, where $CR \le 8.0 \times 10^{-6}$ hour$^{-1}$, comprising the following steps:

(I) providing a dry powder of $Y_2O_3$ and a dry powder of $P_2O_5$;

(II) mixing the powder of $Y_2O_3$ and the powder of $P_2O_5$ to obtain a uniform powder mixture;

(III) sintering the powder mixture obtained in step (II) in a first furnace to obtain a precursor ceramic material having a composition $(Y_2O_3)_x.P_2O_5$;

(IV) crushing the precursor ceramic material obtained in step (III) to obtain a plurality of particles;

(V) forming a first green body having a volume larger than VV, of the ceramic block by mixing uniformly the plurality of particles obtained in step (IV) with an organic binder;

(VI) isopressing the first green body obtained in step (VII) at a pressure of at least 50 MPa to obtain a second green body having a density at standard conditions of at least 60% of the theoretical maximal density of $Y_2O_3.P_2O_5$ under standard conditions; and (VII) heating the second green body in a second furnace to a temperature of at least 1500° C., wherein step (IV) comprises:

(IV-1) pressing the precursor ceramic obtained in step (III) into large particles;

(IV-2) grinding at least part of the particles obtained from step (IV-1) into second particles; and (IV-3) passing the second particles obtained in step (IV-2) through a magnetic separator to remove metal particles.

16. A method according to claim 15, wherein in step (VI), the second green body has a density of at least 65% of the theoretical maximal density of $Y_2O_3.P_2O_5$ under standard conditions.

17. A method according to claim 15, wherein in steps (III) and (VII), the first and second furnace are oxidizing and essentially free of alkali metals.

18. A method according to claim 15, wherein in steps (I), (II) and (V), contamination by Al, Ba, Ca and Zr are avoided.

* * * * *